United States Patent [19]

Bächli

[11] 4,109,605
[45] Aug. 29, 1978

[54] SCARECROW SYSTEM

[76] Inventor: Emil Bächli, Haupstrasse 156, CH-5304 Endingen/AG., Switzerland

[21] Appl. No.: 789,506

[22] Filed: Apr. 21, 1977

[30] Foreign Application Priority Data

Aug. 18, 1976 [CH] Switzerland ............. 010497/76

[51] Int. Cl.² ................. G08B 13/00; G09F 19/12
[52] U.S. Cl. ................................. 116/22 A
[58] Field of Search ....................... 116/22 A, 22 R

[56] References Cited

U.S. PATENT DOCUMENTS

| 1,167,502 | 1/1916 | Huffman et al. | 116/22 A |
| 1,287,968 | 12/1918 | Greenleaf | 116/22 A |

FOREIGN PATENT DOCUMENTS

| 1,281,741 | 10/1968 | Fed. Rep. of Germany | 116/22 A |
| 228,907 | 11/1909 | Fed. Rep. of Germany | 116/22 A |

Primary Examiner—Daniel M. Yasich
Attorney, Agent, or Firm—Flynn & Frishauf

[57] ABSTRACT

A main tow line carries deterrent scarecrow devices such as optical or acoustical devices. The tow line is supported by wire or rope-held pulleys secured to movably supported poles attached in the soil. The tow line is actuated by a drive assembly imparting a reciprocative movement to the main tow line by converting a rotary motion into a linear motion. The system can be operated by motive power which is controlled in accordance with prevailing light intensity conditions by a light sensitive control system. Auxiliary deterrent devices are attached to the poles, i.e. in the regions of the support of the main tow line to provide for protection particularly in corners, and coupled to the separate ropes for the pulleys to be moved thereby upon change of stress when the tow line reciprocates.

17 Claims, 5 Drawing Figures

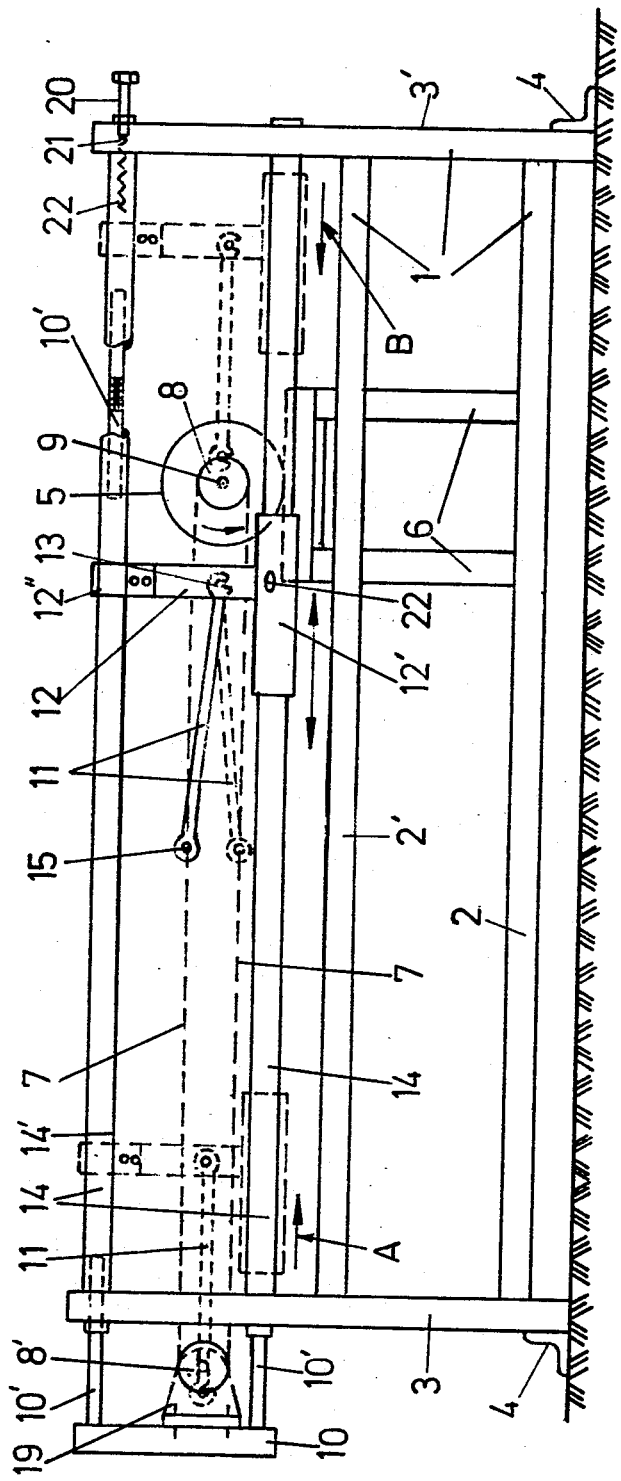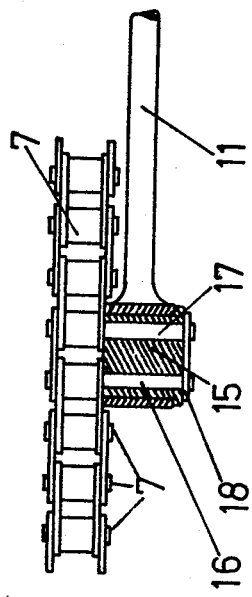

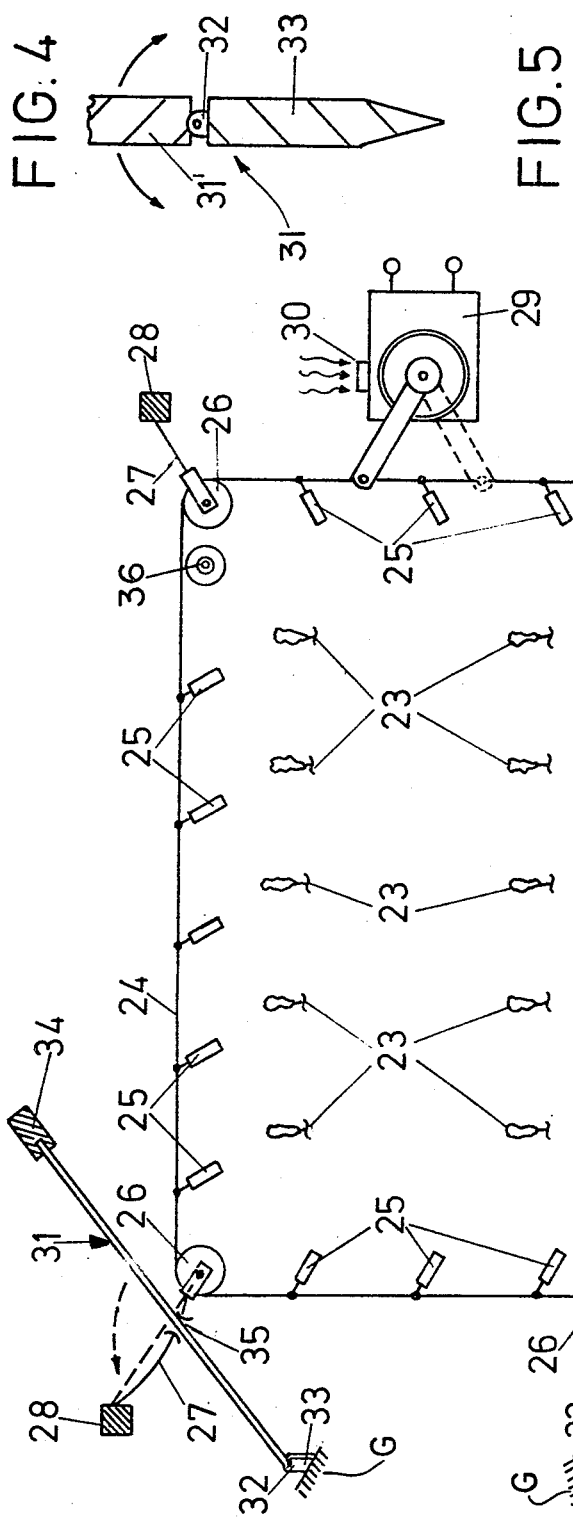

SCARECROW SYSTEM

The present invention relates to a scarecrow system and more particularly to the effective control and actuating system of such devices, for utilization of orchards, gardens, vineyards and the like horticultural or farming plots.

BACKGROUND AND PRIOR ART

It has been proposed the past to protect orchards and the like by use of acoustical, optical or ultrasonic deterrent devices which were stationary located in the plots to be protected in order to repel bird flocks and similar vermins from such plots.

However, it has been observed, when utilizing such stationary optical systems, which at best may be moved by the prevailing wind, that the effectiveness after only short duration after installation of such system is greately decreased since the animals became accustomed to the stationary silhouettes, shapes and other deterrend devices.

When using simply strips of material such as cloth, reflecting foil or the like suspended from supporting ropes or wires, the immobility of such strips of material during calm periods does not provide a deterrent at all.

As well, it has been proposed in the past to cover such plots with nets or similar protective webbing against attack by bird flocks. This approach is limited, however, to relatively small plots since the cost of installing and operating a system according to this method would be prohibitive for large plots.

Furthermore, it has been proposed to protect such plots with acoustical systems such as recordings, played back at high volume, of distress and warning calls of the species against which attack the field or plot was to be protected. As well other noise makers including cap gun noises and the like explosive have been tried in the past. Such methods do add a certain excess of noise to the surrounding neighborhood and it has been found that the deterrent effect of such methods is reduced in a very short period of time after installation. Thus, as the animals become accustomed to the various sounds including recorded distress calls of their own species, they will increasingly ignore such deterrent measures, moreover, when these signals are repeated at regular intervals.

Also known in the art are devices which carry, suspended on carrying ropes, wires or other support means, the scarecrow device or devices. The support means can then be moved in a predetermined sequence in a given motion, i.e. up or down or to and fro.

When employing such devices which have been used in large plots or fields, irrespectively of the particular scarecrow device utilized, i.e. acoustical or optical, the disadvantage arises that the fringes, primarily the corners of rectangular or square plots, are not as effectively guarded against the damage by the animals. As well, in the vicinity of trees and brushwood, providing some cover for the animals, these devices have not been effective in preventing loss due to animal damage and destruction.

THE INVENTION

It is accordingly an object to provide a scarecrow system which will avoid the above-mentioned disadvantages, which can cooperate with the prior art devices described earlier without requiring undue modification and which can be actuated and controlled by simple yet effective means and is simple in installation and relatively maintenance-free; and which can be particularly successfully employed in vineyards or like horticultural plots or fields.

Briefly, the system is comprised of a main tow line carrying the deterrent scarecrow devices which main tow line is supported on guide and support rollers. The main tow line receives the animal deterring scarecrow devices, i.e. acoustical, optical or the like devices and the line is actuated to move the entire assembly in predetermined intervals by means of control devices amongst the plants to be protected. The system is further equipped with auxiliary scarecrow devices complementing those attached to the main tow line, which auxiliary devices are arranged on the support means for the main tow line, typically support poles movably set in the soil.

According to one feature of the invention, the rotary motion of a motor, providing the motive power for the system, is translated into a linear intermittent, preferably oscillating or reciprocating motion. An endless chain is mounted on sprocket wheels of which one is powered by the motor; the chain is connected to an actuating member via a connecting rod which connecting rod will serve to move the actuating member in the linear reciprocating motion when the drive is turning the sprocket wheel and thus the chain. The actuating member in turn serves to transmit the reciprocating linear motion to the main tow line.

The main tow line can be an endless tow rope which is guided on pulleys or like support wheels which in turn are attached to the poles, or to posts, existing walls or the like.

In accordance with yet another feature of the invention, the motor, providing the main motive power, is actuated by a light sensitive or light controlled control system. The motor can receive power from existing power sources, e.g. A.C. or D.C. If such sources are not readily available, the power can be obtained from batteries. In order to increase the versatility of the systems, the power requirements can also be supplied by a portable generator, or the system can be powered by a battery - and - charging of the system using a generator, controlled by the control system such that the generator will be utilized when not sufficient motive power can be supplied by the batteries. Thus, the system is virtually self-contained and relatively maintenance-free. Only a minimum of undesired noise and exhaust emission from auxiliary combustion engines to drive the generator results.

The advantages of the present invention reside in the provision of a compact system of converting the rotary motion of the drive motor, transmitted to the endless chain from where the rotary motion is converted by means of a connecting rod arrangement, into an oscillating reciprocating motion of the actuating member for moving the main tow line. Since the chain is guided over sprocket wheels separated over a certain distance, a relatively constant velocity of the actuating member is achieved which, of course, is transmitted to the main tow line for the scarecrow system which in turn supports the scarecrow devices. This velocity will be dependent on the velocity of the chain. The movement will only be retarded as the connecting rod end which is attached to the endless chain is passing around the sprocket wheels — corresponding to reversal of the direction of travel of the actuating member. The decrease in velocity is, however, offset by a resultant abrupt movement of the main tow line and the scarecrow devices attached to it thus contributing to an increased effectiveness of the system.

Provision of the parts or poles and carrying auxiliary scarecrow devices in the vicinity of the supporting pulleys will ensure that the corners or other turns of the main tow line will be sufficiently protected by the system. Making the tow line longer than the straight line path between pulleys provides for hang-through, so that reciprocation of the two line results in abrupt movement of the auxiliary scarecrow devices. These further auxiliary devices can be actuated by the main tow line such that they are turned or rotated in a twirling motion thus adding a different motion to those carried out by the scarecrow devices attached to the main tow line and the auxiliary scarecrow devices associated with the support means for the main tow line.

The provision of a light sensitive or light controlled control system for the motor will permit actuation of the overall system in accordance with the prevailing light conditions. This means that during daylight conditions, when attack of the fields by bird flocks tends to be greatest, the system will be operated during the intervals selected and entered in the system. On the other hand, during night time or times with unfavorable weather conditions the system may not be required or less required since attack by bird flocks is greatly reduced.

The invention will be described by way of example with reference to the accompanying drawings, wherein:

FIG. 1 is a side elevation of the drive means for the scarecrow system according to the present invention;

FIG. 2 is a fractional view of FIG. 1, showing in greater detail a plan view of the connection between connecting rod and the drive chain;

FIG. 3 is a schematic plan view showing the scarecrow system according to the present invention within a plot to be protected by the system;

FIG. 4 shows in detail an auxiliary deterrent device; and

FIG. 5 shows in detail a further auxiliary deterrent device.

Referring first to FIG. 3, a horticultural plot or field comprising rows of plants, for example vine plants, designated by numeral 23, is protected by a scarecrow system comprised of a main tow line 24, from which are supported the deterrent scarecrow devices designated 25. These devices 25 may be in the form of strips of material, flags or pennants, of reflecting material, with suitable pictorial designs, which devices 25 are arranged in intervals on the main tow line 24. The main tow line follows in general the layout of the field or plot, thus it will avoid interference with the normal growth of the plants to be protected during the growing and harvesting seasons.

The main tow line 24 is supported where it changes its direction of travel and, as required, in shorter intervals, by guide rollers or pulleys 26 which pulleys 26 are in turn supported from retaining ropes or the like designated by numeral 27. Instead of retaining ropes other means such as chains, guy wires, rods or the like may be used. The retaining ropes 27, in turn, are secured to support beams designated 28. It will be appreciated that the retaining ropes 27 can be secured, however, to other suitable and available support means, e.g. existing walls, trees and so forth.

The motive power for the system is transmitted to the main tow line 24 by a drive assembly 29 to be more fully described below.

In FIG. 3 the drive 29 has been schematically represented as a box with crank means for moving the main tow line 24. As will be described below, the drive 29 imparts an intermittent movement, preferably a reciprocating movement to the main line 24. Control of the drive assembly 29 is achieved by an optically controlled electronic control system which in turn is actuated in accordance with prevailing light conditions. In FIG. 3 the light is represented by the wave lines and the control system is designated by the numeral 30. In accordance with the commands from the pre-set controls, the drive assembly 29 is moving the main two line 24 to be described in more detail below. In general, it is contemplated to make the operation of the scarecrow system dependent on the prevailing light intensity such that during night times or unfavorable weather conditions, when normally relatively little or no portection of the plot will be required, the scarecrow system will be at rest.

The retaining ropes 27 are connected to auxiliary scarecrow devices generally designated 31 (FIGS. 3, 4). These auxiliary scarecrow devices have an arm in form of a pole 31' mounted via a joint, designated 32, to a support, designated by numeral 33 secured to a fixed locaton, e.g. the soil, or ground, as schematically shown at G. This support can be a post or other suitable support means located in or secured to the soil, or otherwise fixed. The other end of the arm 31' carries the deterrent causing scarecrow device 34, for example, an optical or acoustical device. In order to guide the arm 31' in its relative position with respect to retaining rope 27, a bushing or guide pipe, designated 35, is provided either on the retaining ropes 27 or on arms 31'.

As can be seen in greater detail in FIG. 4, the post or stake portion 33 of the support 31 comprises a clevis or the like retaining bracket, designated 32, which is connected by means of a pivot pin 32 with a bracket attached to arm 31' such as to permit pivoting of the arm 31'. The operation of these scarecrow devices will be further described below.

Since at times it may be desirable to add further auxiliary scarecrow devices in addition to those just described, which would carry out a different motion than those carried out by the scarecrow devices of the main tow line or the auxiliary scarecrow devices, FIG. 5 shows in greater detail a further auxiliary scarecrow device generally designated 36. This scarecrow device 36 is composed of a rod or similarly shaped member having a restriction in its diameter, which restriction is designated 37 and which is provided with grooves or other similar friction-causing surface roughness, where the grooves extend in a longitudinal direction over the restriction. The tow line 24 is engaged in the restriction such that it will rotate the device 36 in a twirling or rotating motion in a path substantially perpendicular to the planar horizontal motion of the main tow line 24 upon longitudinal movement of tow line 24.

The further auxiliary scarecrow devices 36 are added in irregular intervals to the main tow line and particularly are added in areas where an auxiliary scarecrow device 31 cannot be provied, for example due to limitations in space near trees or bushes. The use of such a further auxiliary scarecrow devices 36 is schematically indicated in FIG. 3 near the turns closest to the drive assembly 29.

The drive unit 29 is best seen with reference to FIG. 1. A rectangular main support frame 1 is constructed of tubular or profile bar material which will serve as support for the drive assembly 29. The frame comprises vertical support sides 3 and 3' as well as horizontal reinforcing members 2 and 2'. The support sides 3 and 3' are supported by legs 4 such that the frame can rest in position without sinking into soft soil. A support formed of members 6 is provided for a motor designated 5. An endless chain 7 is arranged around sprocket wheels 8 and 8'. Sprocket wheel 8' is mounted on a chain tightening support 10 to be described in greater detail below while sprocket wheel 8 is mounted on the shaft 9 of motor 5.

Sprocket wheel 8' is mounted on a housing 19 in linearly spaced apart relation from sprocket wheel 8. Sprocket wheel 8' can be moved with respect to sprocket wheel 8 to adjust the tension of chain 7. This is achieved by mounting the housing 19 on adjustable chain-tightening support base 10 referred to earlier. For tightening, adjustable support base 10 comprises guide rods 10' extending into the horizontal guide members, designated by numerals 14 and 14', which members are mounted on the support sides 3 at the upper and approximately in middle height, respectively. The horizontal guide members are arranged in parallel and congruent with respect to each other. The horizontal tubular members 14 and 14' just referred to also serve to guide on their external circumferences and actuating member 12, to be described in greater detail below, in addition to guiding internally the guide rods 10'.

As best seen in FIG. 2, a connecting rod bushing 15 is attached to chain 7. This bushing is mounted to chain 7 by means of special extended chain pins 16 and 17 and secured in place by a clip or locking link part 18.

In order to transmit driving motion from the motor 5 to tow line 24 a connecting rod 11 is provided, one end of which surrounds the connecting rod bushing 15 and is thus attached to the chain 7. This end of the connecting rod will be referred to in the description as the bushing or chain end of the connecting rod 11. The other end of the connecting rod 11 will be referred to as the coupling end which coupling end is attached to the actuating member 12 referred to earlier. The coupling end of connecting rod 11 is attached to the actuating member 12 by means of a claw or hook-type end portion which cooperates with a pivot pin, designated 13, on the actuating member 12. Tow line 24 (omitted from FIG. 1 for clarity) is connected to the actuating member 12.

Actuating member 12 is arranged to slide on the tubular guide members 14 and 14'. For this, the member comprises an upper yoke or retaining portion, designated 12'', permitting sliding motion of the actuating member 12 on tubular guide 14' and a lower tubular portion, designated 12', arranged perpendicularly with respect to the yoke portion 12'', which lower portion is in turn guided on the lower guide member 14. Thus the actuating member is guided positively in linear direction with respect to a main horizontal path of the system.

As will be appreciated from the foregoing description, on rotating of the chain by motor 5, in a counter-clockwise direction, the connecting rod 11 attached to the chain 7 with its bushing end and to the actuating member 12 with its other end will cause the actuating member to be moved on the guide 14 in linear motion towards the left, in direction of arrow B. Since the chain and connecting rod with its chain end are moving freely around the sprocket 8' the connecting rod 11 will continue its travel and move the actuating member 12 in the opposite direction, i.e. in the direction of the arrow A. Thus the rotary motion of motor 5 is converted into a linear motion of actuating member 12.

The respective end positions of the relative movement of the actuating member 12 are shown in phantom or dash lines in FIG. 1.

When the connecting rod 11 with its bushing end is prescribing the arc motion travelling around sprocket wheels 8 and 8', the velocity of the actuating member 12 will be less than while the rod is moving along the straight path of the chain 7 between tangent-to-tangent of the sprocket wheels 8 and 8'. However, for the operation of the system this delay is not relevant.

Since the actuating member 12 is attached by means of connecting rod 11 to chain 7, which is achieved by directly mounting bushing 15 to a chain link assembly of chain 7, the relative distances of the moving parts are reduced, thus resulting in optimum transmission of the motive power from motor 5 to actuating member 12 and contributing to reduced wear of the mechanism.

The actuating member 12 also comprises a hook or fastening eye bolt (not shown) for connecting of the drive assembly thus far described to the main tow line 24.

As described above, the rotary motion of the motor 5 is translated into a substantially linear motion of the actuating member 12 by means of the chain 7 and connecting rod 11. Actuating member 12 will impart the motion to the main tow line 24.

The tensioning of the chain 7 between sprocket wheels 8 and 8' is achieved by means of an adjustment screw, designated 20, arranged on the upper right end of guide member 14'. The adjustment screw is guided by a nut 21 welded in position in the inside of the guide member 14'. As the adjustment screw 20 is turned, it will move the rod 10' towards the left, direction of arrow B. This motion is transmitted to support base 10 carrying sprocket wheel 8'. When a single adjustment screw 20 is provided in upper guide 14' only the upper guide rod 10' is maintained under the pressure of the adjustment screw and the support base 10 is slightly displaced to the left, directon of arrow B. This set-up will cause a resilient tensioning of the chain. However, as is indicated schematically in FIG. 1, a spring shown by numeral 22, can be arranged in the guide 14' whereby the spring can be cooperating either with or without an adjustment screw. As well, the chain tensioning means just described can be arranged in both the guide members 14 and 14'.

Operation: As desired, the operating periods of the scarecrow system are entered in the control system 30 by selecting start and stop times as well as the frequency of the reciprocating motion of actuating member 12. The control system 30 can then operate the motor 5 in accordance with the data entered. As indicated, the rotary motion of motor 5 is transmitted to chain 7 and then translated into a linear motion by means of connecting rod 11 attached to the chain 7 and the actuating member 12 which in turn actuates main tow line 24 onto which are mounted the scarecrow devices 25.

When the rotation of the motor shaft 9 and thus the speed of the chain 7 is increased, the velocity of the reciprocating linear motion of the actuating member 12 is increased as well. The speed of the actuating member 12 is also dependent on the pitch diameter of the two sprocket wheels 8 and 8', i.e. at smaller pitch diameters of the two sprocket wheels and slower rotation of motor shaft 9, the system will move slower and vice versa. This drive assembly is thus operating with much greater flexibility when compared with simple crank operated systems in which one revolution of the crank corresponds to a full forward and reverse stroke of the reciprocating member. As will be appreciated, in the present system several rotations of the motor shaft 9 will be required for the travel of the actuating member 12 in direction of arrow A and a corresponding number of rotations will be required for travel in direction of the arrow B. Thus the need for complicated transmission means is obviated and good use can be made of the length of the stroke of the movement of the actuating member 12 between the two end positions.

The relative velocity of the actuating member 12 is maintained substantially constant when selecting sprocket wheels with an identical pitch diameter, excepting the travel around the sprockets by the bushing end of connecting rod 11.

At times it may be desirable to vary the motion of the actuating member from a uniform motion to a more complex motion which in turn is transmitted to the main tow line 24 and thus to the scarecrow devices 25 mounted on the two lines 24. This can be achieved by providing sprocket 8', for example, with a larger pitch diameter than sprocket 8, thus, the lines tangent-to-tangent of the sprocket wheels will not be parallel but in sloped relation. Thus, on travelling in direction of arrow B the velocity of the actuating member 12 will be less than during its travel in direction of arrow A. Thus a number of motions can be produced in conjunction with the start and stop impulses controlled by system 30. These motions may be constant reciprocating, fast forward, slow reverse and so forth.

The operation of the auxiliary scarecrow devices 31 will now be described in some more detail. As is indicated in FIG. 3, the retaining ropes 27 are forming an arc while at rest as shown in solid lines in FIG. 3. When the main tow line 24 is set in motion, as described earlier, the ropes 27 will be pulled taught into a straight line as indicated by the broken lines in FIG. 3. The the auxiliary scarecrow devices 31 are moved, abruptly swinging about their pivot pin joint and thus their deterrent action is initiated. When the main tow line 24 comes to rest again the auxiliary scarecrow devices will come to rest again as well.

The combination of the various scarecrow devices suggested in the foregoing description can be modified by employing additional scarecrow devices powered directly by the main tow line 24 as well as using auxiliary devices which, primarily carrying out a swinging motion from a vertical position, can rest on the main tow line.

Also, auxiliary scarecrow devices can be combined with deterrent causing devices moving vertically with respect to the tow line plane, i.e. moving up and down. Such auxiliary devices can be arranged as desired at any given location on the main two line.

I claim:

1. A scarecrow system for the protection of plants in horticultural plots and fields against predatory attack by animals, especially bird flocks, which comprises:
    a main tow line (24) and scarecrow devices (25) attached thereto;
    support means (26, 27, 28, 31') to support said main tow line in a circuitous path amongst the plants (23) to be protected against animal attack;
    drive means (29, 30) attached to said main said main line (24) for linearly moving saidmain tow line; and
    movable auxiliary scarecrow devices (31, 34) operably connected to at least some of said support means (26, 27) and actuated upon movement of said main tow line, said auxiliary scarecrow devices (31, 34) being secured to a fixed position (G) and actuated by said main tow line (24) to move rotatingly from a rest position in arcuate motion perpendicular with respect to the path of the main tow line upon movement of said tow line (24).

2. Scarecrow system in accordance with claim 1, wherein said auxiliary scarecrow devices include acoustical deterrent devices.

3. Scarecrow system in accordance with claim 1, wherein said auxiliary scarecrow devices include optical deterrent devices.

4. Scarecrow system in accordance with claim 1, wherein the auxiliary scarecrow devices (34) are rotatably secured to the support means and engageable with the tow line (24) for rotation in twirling motion by the main tow line whereby said further auxiliary scarecrow devices are actuated in areas out of the effective reach of said first recited auxiliary scarecrow devices.

5. Scarecrow system in accordance with claim 1, wherein the main tow line (24) is a rope and the support means comprises means (27) and pulleys (26) guiding the tow line (24), said at least some pulleys (24) being coupled to and moving the auxiliary scarecrow devices (31, 34).

6. Scarecrow system in accordance with claim 1, wherein the auxiliary scarecrow devices (31, 34) comprise posts (31) secured to the field;
    said support means comprises pulleys (26) and cable means (27) secured thereto at one end, the pulleys (26) guiding said tow line (24) and supporting said tow line in position;
    and the cable means (27) being further coupled to the posts (31) immediate the pulleys and their other end to move the posts upon change of tension applied to the cable means when the tow line (24) is moved by said drive means (29, 30).

7. Scarecrow system in accordance with claim 6, wherein said drive means comprises a intermittent drive.

8. Scarecrow system according to claim 6, wherein said drive means comprises a reciprocating drive.

9. Scarecrow system in accordance with claim 1, wherein said drive means comprises:
    a frame (1) having support sides and vertical reinforcing members and two guide members (14) horizontally extending between the support sides;
    a motor (5) secured to the frame;
    and endless driven chain (7) mounted on a pair of sprocket wheels (8, 8') mounted on said frame;
    means (9) rotating one sprocket wheel (8) by the motor to impart a rotary motion to said sprocket and said chain (7);
    an actuating member (12) guided on said guide members (14) on said frame for substantially linear reciprocating motion, the tow line (24) being connected to said actuating member; and
    a connecting rod (11) attached to said actuating member with one end and to said chain with the other end.

10. Scarecrow system in accordance with claim 9, further comprising a light sensitive control system for actuating said motor.

11. Scarecrow system in accordance with claim 9, wherein said motor is powered by a portable generator.

12. Scarecrow system in accordance with claim 9, wherein said connecting rod (11) is attached to said chain (7) by a cylindrical bushing mounted on two extended chain link pins of said chain and said bushing is locked in place by a locking side link on said chain.

13. Scarecrow system in accordance with claim 1, wherein the length of the tow line (24) is longer than the straight line path between said support means (26, 27, 28, 31') so that the tow line will have hang-through;
wherein the drive means (29, 30) comprises a reciprocating drive to reverse the direction of motion of the tow line from time to time and thereby change the instantaneous condition of the hang-through of the tow line upon change of movement imparted to the tow line and thereby impart random movement to the scarecrow devices (25) and additionally change the stress on the support means (26, 27, 28) and hence move the auxiliary scarecrow devices coupled to the support means;
and wherein the auxiliary scarecrow devices (31, 34) comprise posts (31) secured to the field;
said support means comprises pulleys (26) and cable means (27) secured thereto at one end, the pulleys (26) guiding said tow line (24) and supporting said tow line in position;
and the cable means (27) being further coupled to the posts (31) immediate the pulleys and their other end to move the posts upon change of tension applied to the cable means when the tow line (24) is moved by said drive means (29, 30).

14. Scarecrow system in accordance with claim 13, wherein said drive comprises:
a frame (1) having support sides and vertical reinforcing members and two guide members (14) horizontally extending between the support sides;
a motor (5) secured to the frame;
an endless driven chain (7) mounted on a pair of sprocket wheels (8, 8') mounted on said frame;
means (9) rotating one sprocket wheel (8) by the motor to impart a rotary motion to said sprocket and said chain;
an actuating member (12) guided on said guide members (14) on said frame for substantially linear reciprocating motion of said actuating member on said guide members, the tow line (24) being connected to said actuating member;
and a connecting rod (11) attached to said actuating member with one end and to said chain with the other end.

15. Scarecrow system in accordance with claim 13, wherein said support means are located at positions of change of direction of said main tow line (24), said main tow line (24) being looped, at least in part, around said pulleys (26) to include an angle therewith;
and wherein said auxiliary scarecrow devices are located outside of said angle included by the main tow line (24) in its path around the pulley (26) to protect corners of the field at positions outside of the protection zone included by the tow line (24).

16. Scarecrow system in accordance with claim 1, wherein the length of the tow line (24) is longer than the straight line path between said support means (26, 27, 28) so that the tow line will have hang-through;
and wherein the drive means (29, 30) comprises a reciprocating drive to reverse the direction of motion of the tow line from time to time and thereby change the instantaneous condition of the hang-through of the tow line upon change of movement imparted to the tow line and thereby impart random movement to the scarecrow devices (25) and additionally change the stress on the support means (26, 27, 28) and hence move the auxiliary scarecrow devices coupled to the support means.

17. Scarecrow system according to claim 16, wherein said support means are located at positions of change of direction of said main tow line (24), said main tow line (24) being looped, at least in part, around said pulleys (26) to include an angle therewith;
and wherein said auxiliary scarecrow devices are located outside of said angle included by the main tow line (24) in its path around the pulley (26) to protect corners of the field at positions outside of the protection zone included by the tow line (24).

* * * * *